United States Patent [19]

Bradley

[11] 4,374,542
[45] Feb. 22, 1983

[54] UNDULATING PRISMOID MODULES

[76] Inventor: Joel C. Bradley, Rio Mississippi 107 Ote. Aptdo. 85, col. Del Valle, San Pedro, Garza Garcia, N.L., Mexico

[21] Appl. No.: 843,054

[22] Filed: Oct. 17, 1977

[51] Int. Cl.³ ............................................. F28F 3/12
[52] U.S. Cl. .................................. 165/166; 366/337; 159/28 P
[58] Field of Search ...................... 366/337; 159/28 P; 165/157, 166, 167; 261/DIG. 11

[56] References Cited

U.S. PATENT DOCUMENTS

| | | |
|---|---|---|
| 832,400 | 10/1906 | Lyons . |
| 2,777,674 | 1/1957 | Wakeman ........................... 165/167 |
| 3,239,197 | 3/1966 | Tollar . |
| 3,406,947 | 10/1968 | Harder . |
| 3,476,521 | 11/1969 | Wise . |
| 3,498,372 | 3/1970 | Patten et al. ....................... 165/166 |
| 3,632,090 | 1/1972 | White . |
| 3,661,203 | 5/1972 | Mesher ............................... 165/167 |
| 3,701,619 | 10/1972 | Appeldoorn et al. . |
| 3,770,249 | 11/1973 | Schmitt . |
| 3,804,376 | 4/1974 | Clasen . |
| 3,807,496 | 4/1974 | Stadmark .......................... 165/167 |
| 3,814,172 | 6/1974 | Shore et al. ....................... 165/166 |
| 3,860,217 | 1/1975 | Grout . |
| 3,871,624 | 3/1975 | Huber et al. . |
| 3,942,765 | 3/1976 | Henrickson . |

FOREIGN PATENT DOCUMENTS 901914 7/1962 United Kingdom ................ 165/166
1203416 8/1970 United Kingdom .
1433379 4/1976 United Kingdom .

OTHER PUBLICATIONS

Chemical Engineering Magazine, Sep. 12, 1977 (Advertisement for "Sulzer Packed Columns").

Primary Examiner—William R. Cline
Assistant Examiner—Theophil W. Streule, Jr.
Attorney, Agent, or Firm—Cushman, Darby & Cushman

[57] ABSTRACT

An undulating prismoid module made of relatively rigid material. The prismoids may have bases of any number of sides, and preferably a plane passing through the centers of the prismoid bases in any row of prismoid bases is nonparallel to the sides of the module. The modules may be stacked and fluid inlets and outlets provided in the void volume between modules so that the modules may be used as a heat exchanger, an extraction tower, absorption towers, distillation towers, an adsorption tower, chemical or bilogical reactors, and water cooling towers. The modules are disposed in repeating patterns of four in the stack, each module in the stack being rotated 180° about a first or second horizontal axis with respect to the previous model.

7 Claims, 9 Drawing Figures

UNDULATING PRISMOID MODULES

BACKGROUND AND SUMMARY OF THE INVENTION

The invention relates in general to a structure for dispersing fluids and fluent materials (such as granular solids or powders). The invention primarily relates to the provision of a new module having a particular geometric shape for utilization in a wide variety of industrial process wherein fluid contacting, mixing, or characteristics exchange are desirable. There have been many prior art structures, such as shown in U.S. Pat. Nos. 3,476,521 and 3,871,624, for providing various contacting or mixing function, however it is believed that such prior art structures do not have the universal applicability of the module according to the present invention for use in a wide variety of industrial processes, nor do they effect the mixing, contacting, or like functions any better than or as well as the module according to the present invention, nor do they lend themselves to the ease of construction and transportation provided by the module of the invention.

According to the present invention, an undulating prismoid module made of relatively rigid material is provided.

The term "undulating prismoid module" as utilized in the present specification and claims means a three-dimensional module formed as a thin sheet having repeating regular prismoid surface manifestations formed on either face thereof, in undulating form, with each prismoid having a base that projects outwardly from a midpoint of the module. Each projecting base is surrounded by quandrant situated projecting bases of adjacent prismoids, the four quadrant situated projecting bases of adjacent prismoids being disposed on the opposite side of a plane passing through the module parallel to the center projecting base and bisecting the module, as the center projecting base. For the purposes of the present invention disclosure, a truncated cone is considered to be a special case of a prismoid.

Preferably each module is formed as a quadrate (in plan view)—most desirably a rectangle. The base of each prismoid may be any polygon (a circle being a polygon having an infinite number of sides), but preferably is a square (or rectangle), hexagon, octagon, or circle. Where the module is quadrate and the polygon base of each prismoid is square, a plane extending through the diagonals of a plurality of prismoid bases makes a first acute angle greater than 45°, or a second acute angle that is the complement of the first acute angle. For instance, the first acute angle may be 63.5°, and the second acute angle 26.5°. In general, a plane passing through the centers of the prismoid bases in any row of prismoid bases is non-parallel to the sides of the module.

The modules are substantially identical in shape; therefore they can be stacked in a low volume configuration—essentially no void volume—for storage. In use, however, they are disposed so that void volume is provided therebetween, certain projecting prismoid bases abutting other projecting prismoid bases of adjacent sheets. Most desirably, when the modules are formed as quadrates with diagonal lines extending through the prismoid bases forming acute angles, four such modules are stacked in the following pattern: The first module is laid flat (horizontal) with its orientation noted; the second module is originally positioned with the same orientation as the first module and then is rotated 180° about a first horizontal axis, and then is placed on top of the first module, with the result that some prismoid projecting bases of each module abut those of the other module; the third module is originally positioned with the same orientation as the second module, and then is rotated 180° about a second horizontal axis perpendicular to the first horizontal axis, and then is placed on top of the second module, with the result that some prismoid projecting bases of each module abut those of the other module; and the fourth module is originally positioned with the same orientation as the third module, and then is rotated 180° about the first horizontal axis, and then is placed on top of the third module, with the result that some prismoid projecting bases of each module abut those of the other module. If desired, this arrangement can be repeated indefinitely, the fifth module having the same orientation as the first, the sixth as the second, etc. Means are provided for fastening at least some prismoid projecting bases to abutting bases.

A stack of modules according to the present invention has use for many industrial processes, whether co-current, counter-current, or cross-current flow of fluid or fluent material is provided. For instance, the void volume on either side of a module may be sealed from each other by providing a seal around the intervening module edge, and first and second liquids having different characteristics can be passed on either side of the module, with characteristics transfer taking place across the module. For instance, the module may be used as a plate "heat exchanger", heat transfer between the two fluids taking place through the heat conducting module. Additionally, it may be used as a blending structure for the blending of gases, liquids, paste, powders, and the like with each other, and liquids with powders. When used to perform a contacting function, it can be used in extraction towers (liquid-liquid contact), absorption or desorption towers (liquid-gas contact), distillation towers (liquid-gas contact), adsorption towers (solids-gas or liquid contact), chemical or biological reactors (gas or liquid-solid, gas or liquid contact) and water cooling towers (gas-liquid contact). In functioning to provide all of the above uses, the stacked modules form easy passages for the stream flowing within the void volume defined therebetween but at the same time intermix the stream and produce turbulence. The opposing slopes of the faces of the prismoids produce a mixing effect, and the undulations of the prismoids produce dispersion, both effects together—and the angular peak and valley arrangement provided thereby—producing turbulence. The particular prismoids selected, the angular taper of the prismoids, and their relative spacing will be chosen for best results depending upon the particular use to which the module is to be put.

In use as a packing for an industrial tower, the modules according to the present invention have numerous desirable features such as: the capacity to disperse the fluids and to produce as much fluid surface area available for contact as possible; a high ratio of active packing surface area to volume of packing; capacity to produce turbulence in the stream flowing within the packing; provision of relatively smooth flow of the streams in the void spaces without abrupt deflections and restrictions; even distribution within the packing so that no channeling can occur; lightweight; high strength characteristics to support pressure and weight loads;

versatility for use with co-current, cross-current and counter-current modes of flow; and ease of manufacture and shipment.

It is a primary object of the present invention to provide an improved structure for use as a packing in industrial processes. This and other objects of the invention will beome clear from an inspection of the detailed description of the invention, and from the appended claims.

DETAILED DESCRIPTION OF THE DRAWINGS

Figure 1:
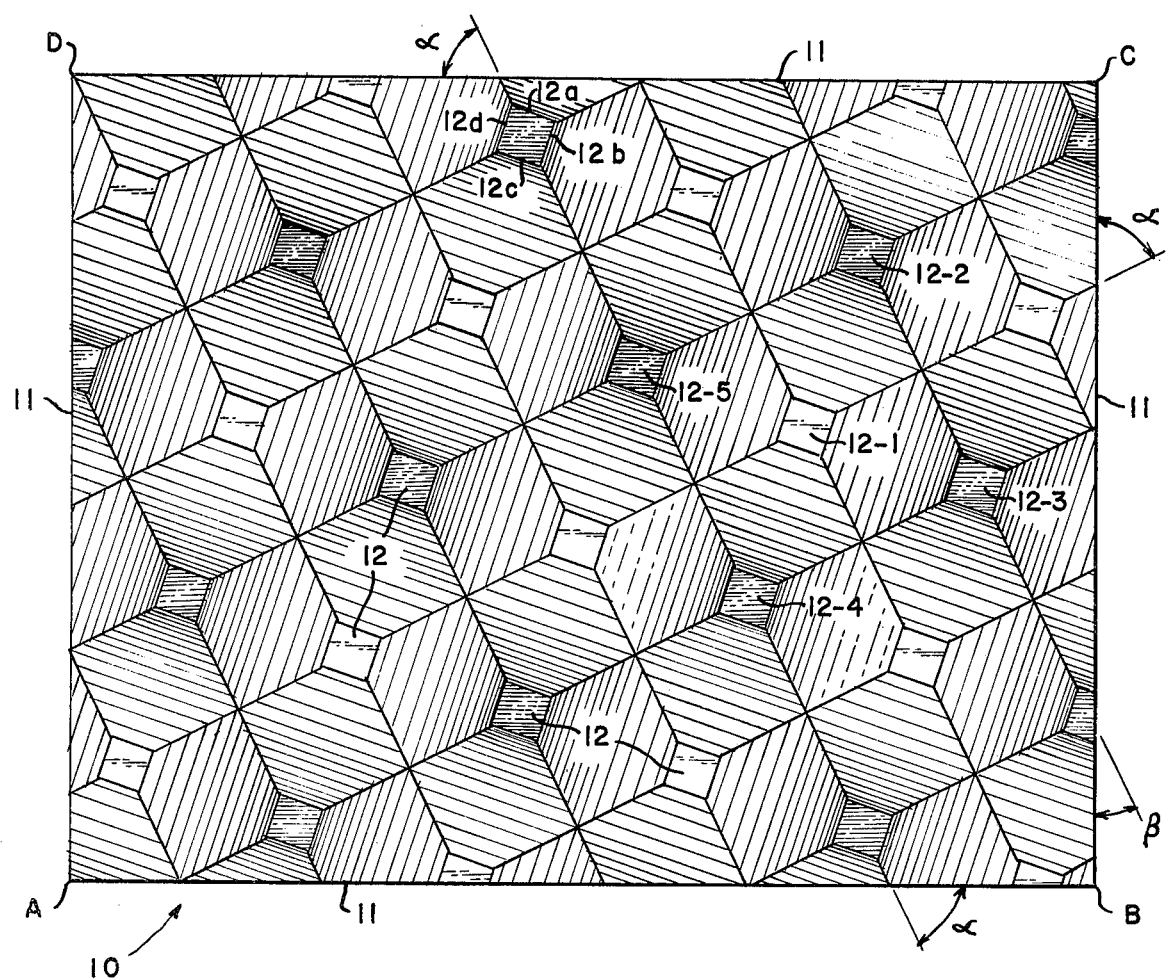
FIG. 1 is a top plan view of an exemplary module according to the present invention.

Exemplary undulating prismoid modules according to the invention are illustrated generally at 10 in the drawings. The term "undulating prismoid module" as utilized in the present specification and claims means a three-dimensional module formed as a thin sheet having repeating regular prismoid surface manifestations formed on each face thereof, in undulating form, with each prismoid having a flat, distal base, 12, that projects outwardly from a midpoint of the module; as shown in the drawings, each base 12 is in a plane substantially parallel to the planes containing all the other bases 12. Each projecting base 12 is surrounded by quadrant situated projecting bases 12 of adjacent prismoids, the four quadrant situated projecting bases 12 of adjacent prismoids being disposed on the opposite sides of a plane passing through the module parallel to the center of projecting base 12 and bisecting the module 10. As shown in FIG. 1, the module 10 is formed as a quadrate in plan view, the module having sides 11. Also in the special case of FIG. 1, the prismoid bases 12 are formed as squares, a plane extending through the diagonals of a plurality of prismoid bases 12-4, 12-5 making a first acute angle $\alpha$ greater than 45° with respect to an edge 11 of the module 10, or an angle $\beta$ that is the complement of the angle $\alpha$. In the special case of FIG. 1, the angle $\alpha$ is shown as 63.5°, and the angle $\beta$ as 26.5°, although a wide variety of angles may be provided. In general, for any module according to the invention, a plane passing through the centers of the prismoid bases 12 in any row of prismoid bases (i.e. 12-4, 12-5 or 12-4, 12-3, or 12-4, 12-1) is nonparallel to the sides 11 of the module 10. In FIG. 1, the four corners of the module 10 are designated as A, B, C, and D, so that the manner of assembling the modules in a stack can readily be described.

Since all of the modules may be formed identically, they may be disposed in a low volume configuration stack—with essentially no void space between the modules—merely by orientating them so that the corners A, B, C, and D of adjacent modules line up. When provided in a stack, however—see FIGS. 2-5—adjacent modules are disposed so that they have different orientations so that void volume is provided between adjacent modules. For instance, a stack of five modules, 10-1, 10-2, 10-3, 10-4, and 10-1, is provided in FIGS. 2, 3, and—diagrammatically—FIG. 5. For the purposes of description, the module stacking procedure will be described as if the first module were laid flat in a horizontal plane, although it is readily apparent that the modules could be assembled in a vertical position, or in any other position.

Figure 5:
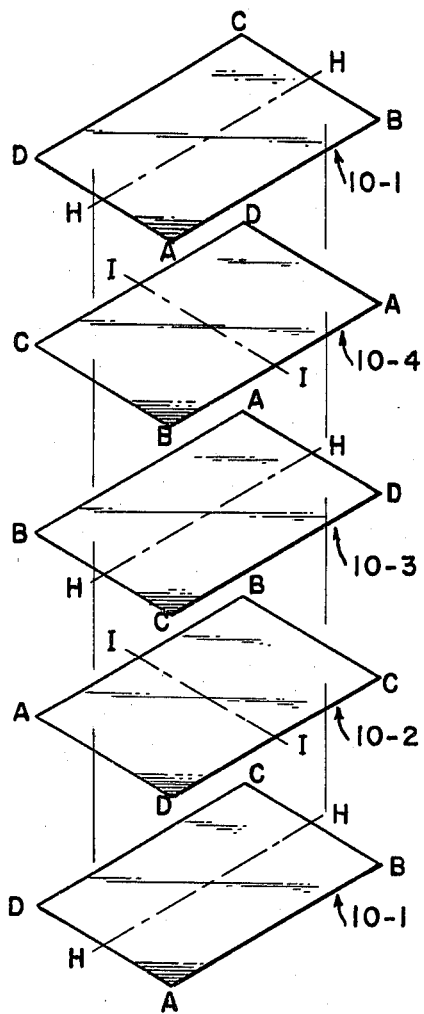
FIG. 5 is a exploded, diagrammatic view illustrating the manner of assembly of modules in a stack.

With particular reference to FIG. 5, assembly of a stack of modules will now be described. The first module 10-1 is laid horizontal, and the second module 10-2 is originally positioned with the same orientation as the first module 10-1, and then is rotated 180° about a first horizontal axis H—H, and then is placed on top of the first module, with the result that some prismoid projecting bases 12 of each module abut those of the other module. The third module 10-3 is originally positioned with the same orientation as the second module 10-2, and then is rotated 180° about a second horizontal axis I—I perpendicular to the first horizontal axis H—H, and then is placed on top of the second module. The fourth module 10-4 is originally positioned with the same orientation as the third module 10-3, and then is rotated 180° about the first horizontal axis H—H, and then is placed on top of the third module. The fifth module has the same orientation as the first module 10-1, and thus can be considered another first module, and it is disposed on top of the fourth module 10-4. In this way, a stack of modules is provided whereby void volume exists between each of the modules.

Figure 4:
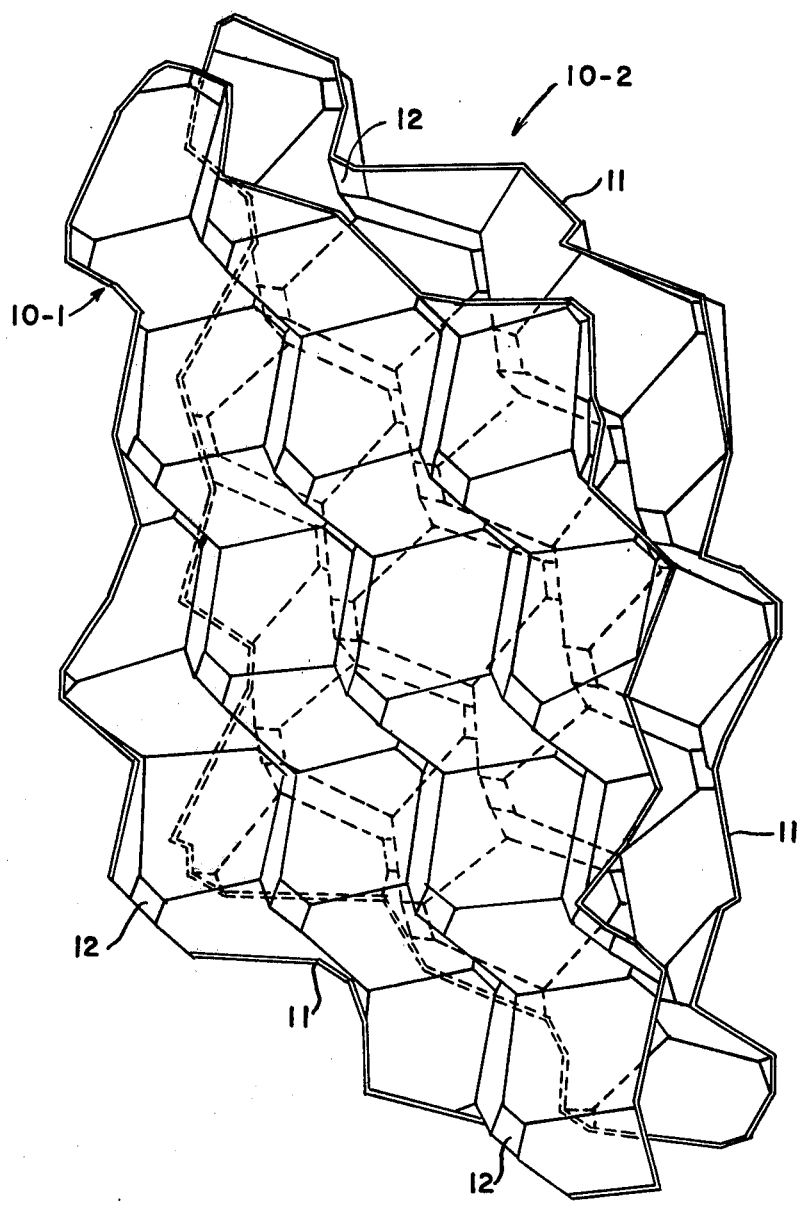
FIG. 4 is a perspective view of two assembled modules according to the invention.

The shaded areas in FIG. 4 indicate some of the prismoid projecting bases 12 of each module that abut those of an adjacent module. The modules may be attached together by any suitable means for fastening the abutting projecting bases 12 together. For instance, the abutting projections 12 may be glued together, or when the modules 10 are made of suitable material, soldered or welded together. Additionally, a wide variety of mechanical bolting or fastening means could be provided, or cooperating female-male connectors could be formed on the modules themselves during formation of the modules. Each of the individual modules 10 has a good deal of inherent structural strength because of the configuration thereof, and the modules may be formed from relatively lightweight materials, and/or formed as very thin sheets, yet they are able to withstand—when assembled as a packing—pressure loads in any direction. When the modules are to be used as a heat exchanger, they will preferably be constructed of sheet metal, or other heat conducting material. Otherwise, the material from which the modules will be constructed depends only upon the particular use to which the module is to be put, and a wide variety of materials—such as molded plastic, fibrous material, various ceramics, etc. may be employed.

Figure 2:
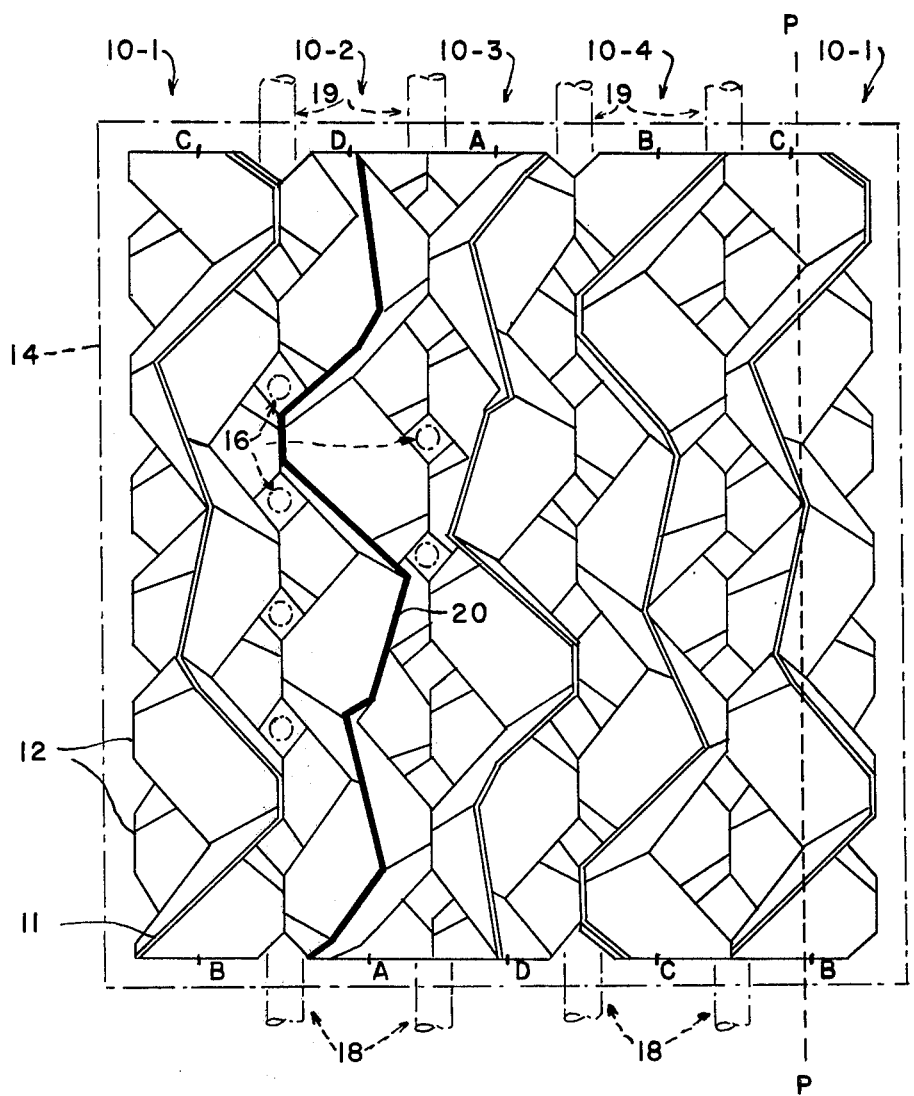
FIG. 2 is a top view looking down upon a stack of assembled modules according to the invention.
Figure 3:
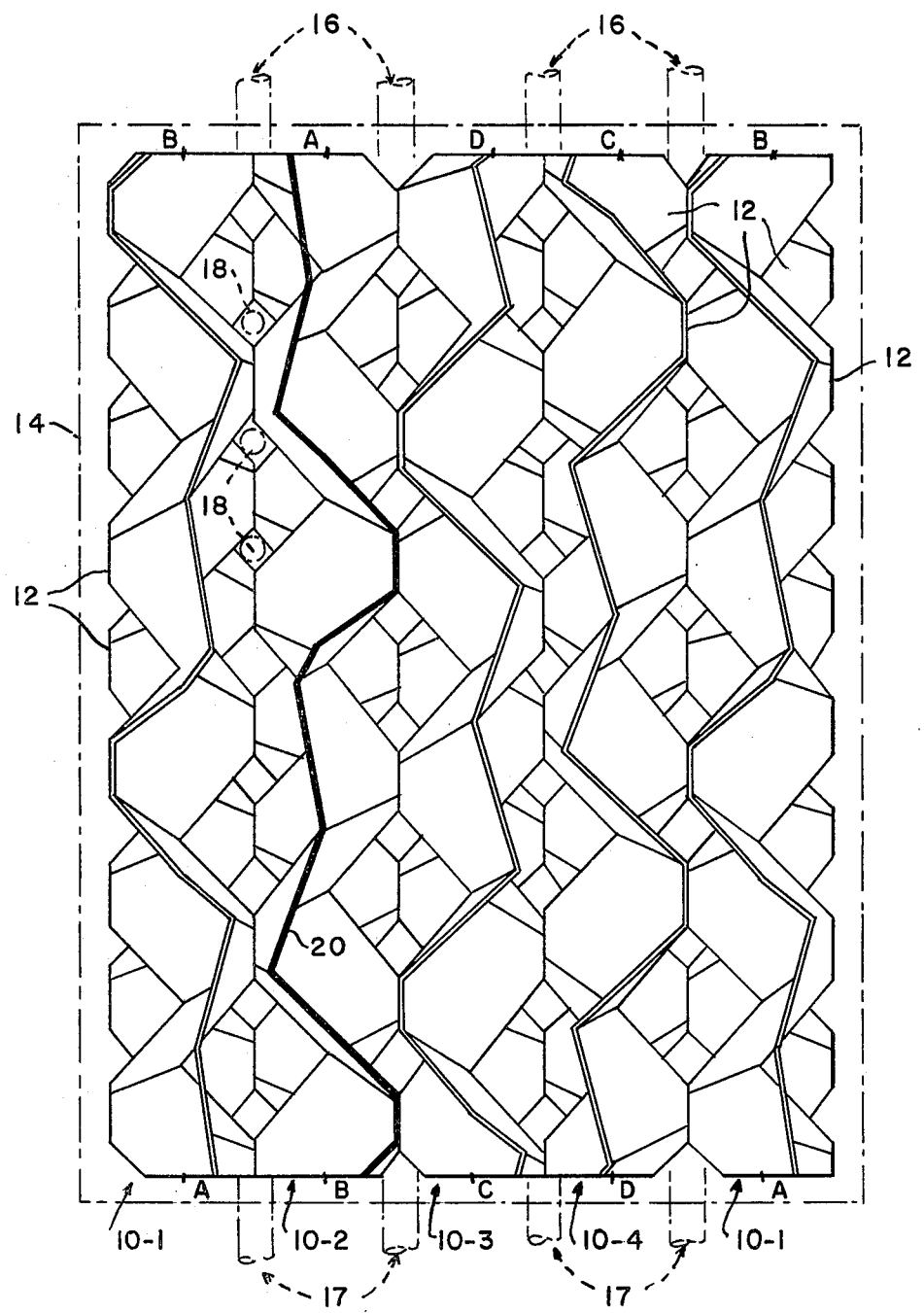
FIG. 3 is a front view of the stack of FIG. 2.

Conventional structure utilizable with a stack of modules according to the present invention for utilizing the invention in industrial processes is shown schematically in dotted line in FIGS. 2 and 3. A conventional tower 14 can be provided disposed around a stack of modules 10, with fluid or fluent material inlets or outlets 16, 17, 18, and 19 disposed at various portions of the module stack for introducing fluid into or withdrawing fluid from the void volume between the modules. While a number of fluid conducting means 16, 17, 18, 19 are provided associated with each stack side in the drawings, it is of course understood that only a single inlet or outlet need be provided, communicating with one or more of the void volumes disposed between adjacent modules of the stack. Which fluid conducting means 16, 17, 18, 19 will be utilized depends upon the particular use to which the stack is put, and whether co-current, countercurrent, or cross-current contacting or mixing is to be provided. For instance, where the structure is to be utilized as a distillation, absorption or desorption tower, liquid would be introduced into the void volumes between all of the modules through one or more fluid conducting means 16, while gas was introduced into the void volumes through one or more fluid conducting means 17, while the liquid would be withdrawn through the means 17 and the gas withdrawn through the means 16. Where cross-current mixing of two liquids was to be practiced, the first liquid could be introduced through one or more means 16 and the second liquid introduced through one or more means 18, while the mixture would be withdrawn through the fluid conducting means 17 and/or 19. The particular connections necessary for utilizing the modules for a wide variety of other conventional contacting or mixing operations will be readily apparent to those skilled in the art.

When the modules are to be particularly used as plate heat exchangers, it is necessary to provide a seal—such as a seal 20 along edge 11 (see FIG. 3)—in order to practice the invention. The seal 20 separates the void volumes disposed on either side of the module 10-2 so that no fluid-communication therebetween is possible. A first fluid having first characteristics is then introduced between modules 10-1 and 10-2, while a second fluid having second characteristics is introduced between module 10-2 and module 10-3, and the relative flows of the liquids may be either cross-current, countercurrent, or co-current. The characteristics of the two fluids are then brought closer together as the fluids pass in the void volume between the modules; that is, if one of the fluids is at a higher temperature than the other, heat exchange takes place through the module 10-2, a large surface area for heat exchange being provided by the particular configuration of the module, yet a minimum resistance to the passage of fluid through the void volume (thereby minimizing pump energy consumption, etc.) is provided.

Figure 6A:
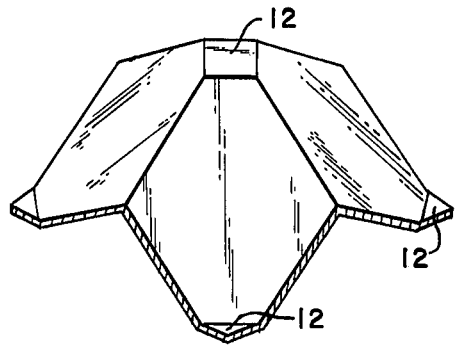
FIGS. 6a through 6d are detailed perspective views of exemplary prismoids utilizable in constructing modules according to the invention.
Figure 6B:
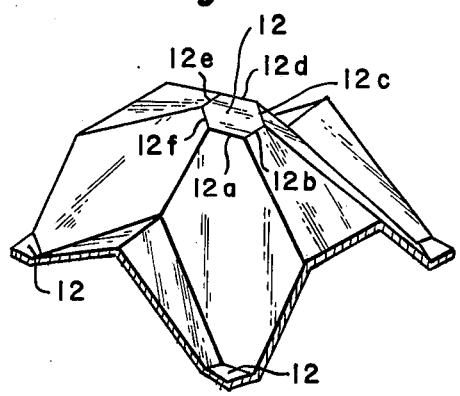
Figure 6C:
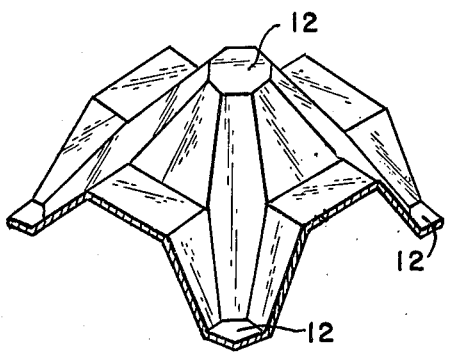
Figure 6D:
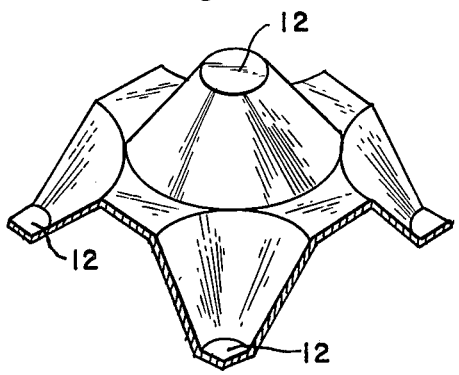

As mentioned above, a wide variety of particular prismoid base shapes and tapers may be provided to construct modules according to the present invention, depending upon the use to which they are put. Four such exemplary prismoid arrangements are illustrated in FIGS. 6a–6d, FIG. 6a showing quadrate-based prismoids, FIG. 6b hexagonal-based prismoids, FIG. 6c octagonal-based prismoids, and FIG. 6d showing circular based prismoids (a truncated cone being considered as a special case of a prismoid for the purposes of the present invention). No matter what the particular configuration of the prismoid base—as clearly shown in FIGS. 1 and 6—each projecting base 12 is surrounded by quadrant situated projecting bases 12; with particular reference to FIG. 1, it will be seen that the projecting base 12-1 (center projecting base) has quadrant situated projecting bases 12-2, 12-3, 12-4, and 12-5. The four quadrant situated projecting bases 12-2, 12-3, 12-4 and 12-5 are disposed on opposite side of a plane passing through the module 10 parallel to the center projecting base 12-1 and bisecting the module—as an inspection of FIG. 2 will make apparent (plane P—P bisecting the module 10-1). In each case, the particular arrangement of the undulating prismoids and their relationship with the undulating prismoids of an adjacent module with which they define a void volume, produce mixing, dispersion, and turbulence in the system of angular peaks and valleys, provide a maximum amount of contact surface area to the volume of packing, while still providing minimum resistance to the flow of fluid therethrough, and evenly distributing the fluid flow to prevent channeling.

It will thus be seen that according to the present invention an undulating prismoid module made of relatively rigid material has been provided which is utilizable for a wide variety of purposes, such as fluid contacting, mixing, and properties exchange (heat exchanger), either for co-current, cross-current, or countercurrent flow, that is easy to manufacture and transport yet is very desirable in accomplishing the desired function, whatever it might be. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A stack of substantially identical undulating prismoid modules, each undulating prismoid module having a polygon shape in plan, and made of relatively rigid material; the stack having at least first and second modules, and means for providing confined flow of fluid between the modules, including inlet and outlet means; wherein the improvement comprises for each module a plane passing through the centers of the prismoid bases in any row of prismoid bases being nonparallel to the sides of the module; and the first module in the stack having a first orientation, and being disposed in a horizontal plane, and the second module having a second orientation which is said first orientation rotated 180° about a first horizontal axis, so that some, but not all, prismoid projecting bases of each module abut those of the other module.

2. A stack of substantially identical undulating prismoid modules, each module being quadrate and made of relatively rigid material; the stack having at least first and second modules, and means for confining a flow of fluid between the modules, including inlet and outlet means, wherein the improvement comprises:

each module formed so that the prismoids forming the module have quadrate bases, and wherein a plane passing through the diagonals of a plurality of prismoids of the module makes a first actue angle of greater than 45° with a module edge that it intersects, or a second acute angle which is the complement of the first acute angle; and the first module in the stack having a first orientation, and being disposed in a horizontal plane, and the second module having a second orientation which is said first orientation rotated 180° about a first horizontal axis, so that some, but not all, prismoid projecting bases of each module abut those of the other module.

3. A stack as recited in claim 1 wherein each of said prismoids comprises a hexagonal based prismoid.

4. A stack as recited in claim 1 wherein each of said prismoids of each module comprises an octagonal based prismoid.

5. A stack as recited in claim 1 wherein each of said prismoids of each module comprises a truncated cone.

6. A stack of substantially identical undulating prismoid modules, each module being quadrate and made of relatively rigid material, and at least four modules being provided in the stack; and including means for confining fluid flow between modules in the stack including inlet and outlet means: wherein the improvement comprises each module being constructed so that a plane passing through the diagonals of a plurality of prismoids of the module makes a first acute angle of greater than 45° with the module edge that it intersects, or a second acute angle which is the complement of the first acute angle; and wherein the first module in the stack has a first orientation, and is disposed in a horizontal plane; and the second module in the stack has a second orientation which is said first orientation rotated 180° about a first horizontal axis; and the third module in the stack has a third orientation which is said second orientation rotated 180° about a second horizontal axis perpendicular to said first horizontal axis; and the fourth module in the stack has a fourth orientation which is said third orientation rotated 180° about said first horizontal axis; and wherein subsequent modules in the stack repeat said first, second, third, and fourth orientations in order; so that some, but not all, prismoid projecting bases of each module abut those of the modules adjacent thereto.

7. A stack of of substantially identical undulating prismoid modules, each module having a polygon shape in plan and made of relatively rigid material; at least four modules being provided in the stack; and means for confining the flow of fluid between the modules in the stack, including inlet and outlet means, wherein the improvement comprises each of said undulating prismoid modules being polygon shaped in plan, and a plane passing through the centers of the prismoid bases in any row of prismoid bases being nonparallel to the sides of the modules; and wherein the first module in the stack has a first orientation, and is disposed in a horizontal plane; and the second module in the stack has a second orientation which is said first orientation rotated 180° about a first horizontal axis; and the third module in the stack has a third orientation which is said second orientation rotated 180° about a second horizontal axis perpendicular to said first horizontal axis; and the fourth module in the stack has a fourth orientation which is said third orientation rotated 180° about said first horizontal axis; and wherein subsequent modules in the stack repeat said first, second, third, and fourth orientations in order; so that some, but not all, prismoid projecting bases of each module abut those of the modules adjacent thereto.

* * * * *